Dec. 4, 1928.  
A. F. KAPTULLER  
1,693,757  
MACHINE FOR EXPRESSING JUICE FROM FRUIT, CHOPPING MEAT, ETC  
Filed Dec. 8, 1926  5 Sheets-Sheet 5

Patented Dec. 4, 1928.

1,693,757

UNITED STATES PATENT OFFICE.

ALEXANDER F. KAPTULLER, OF CHICAGO, ILLINOIS.

MACHINE FOR EXPRESSING JUICE FROM FRUIT, CHOPPING MEAT, ETC.

Application filed December 8, 1926. Serial No. 153,248.

My invention relates to machines for expressing juice from fruit, chopping meat, or other purposes involving the use of a pressure feeding device and in some instances a screen for separating the juices from the remaining portions of the mass of materials being operated upon, and it has for its object the provision of a new and improved form and arrangement of parts by which the operation shall be rendered satisfactory and the convenience of operation shall be greatly increased. It is the particular object of my invention to provide a machine of this type for crushing grapes and expressing the juice therefrom.

It is one of the objects of my invention to provide an improved tapered feeding screw, together with novel means for driving the screw, arranged so that there may be unrestricted access at the end of the screw to the compression chamber between the convolutions in the direction lengthwise of the screw, the arrangement being such that the material fed to said chamber shall be forced along the screw with little or no tendency to move in the reverse direction out of the chamber when first fed thereto.

It is another object of my invention to provide an improved screen arranged to cooperate with the screw for feeding the material therealong, and an improved support for the screen in relation to the screw whereby such parts may cooperate to advantage, improved means being provided for securing the screw and screen together removably in position so that they may be detached readily for cleaning and then again quickly and easily applied in operative position. It is another object to improve the frame with respect to the support of the parts so as to operate properly and so as to be accessible, and particularly with reference to the support and adjustment of the motor and the tightening of the motor belt.

It is another object of my invention to provide adjustable means in connection with a screw feeding device of this type whereby the degree of pressure exterted upon the pulp being fed forward by the screw can be regulated.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings,—

Fig. 3 is a central vertical section through a portion of the machine at the upper end thereof;

Referring to the several figures of the drawing in which corresponding parts are indicated by the same reference characters, 20 indicates a frame plate in the form of a casting provided with a flange 21 extending thereabout at its outer edge portion. The flange 21 is provided at intervals thereabout with lugs 22 in spaced relation for receiving tubular legs 23 therebetween, such legs being held in fixed position between the lugs by means of bolts 24. In the construction shown three legs 23 are provided, but the invention is not in any way restricted with respect to the number of the legs.

As is best shown in Fig. 3, the frame plate 20 is provided with a central opening therethrough with a flange 25 extending thereabout, such flange being provided with an annular shoulder on its inner face for supporting the upper end of a tapered grille member 26. As is clearly shown in Fig. 7, the grille member 26 comprises a ring 27 at its upper end provided with an outwardly extending flange 28 for engagement with the shoulder on the inner face of the annular flange 25 of the plate 20, such ring 27 being provided with downwardly extending bars 29 which in the construction shown are formed integrally with the ring, the bars 29 converging downwardly to the lower end of the grille where they merge into a ring 30. Intermediate strengthening rings 31 are provided, also formed integrally with the bars 29. At one side, the ring 27 is provided with a notch 32, as is clearly shown in Fig. 4, which engages with a pin 33 carried by the ring 25 of the frame plate 20 for holding the grille 26 from rotation with respect thereto. The arrangement is such that the grille 26 can be readily inserted into position in the frame-work and can be as readily removed therefrom.

Within the reinforcing member or grille 26, and supported thereby, there is a correspondingly tapered screen 34, which in the construction shown is formed of sheet metal, lapped portions 35 of which at opposite sides of the screen fit within grooves 36 in two of the bars 29 of the grille for holding the screen from rotation with respect thereto. The screen 34 is to be loosely mounted within the grille so as to be readily removable therefrom.

Figures 11, 12:
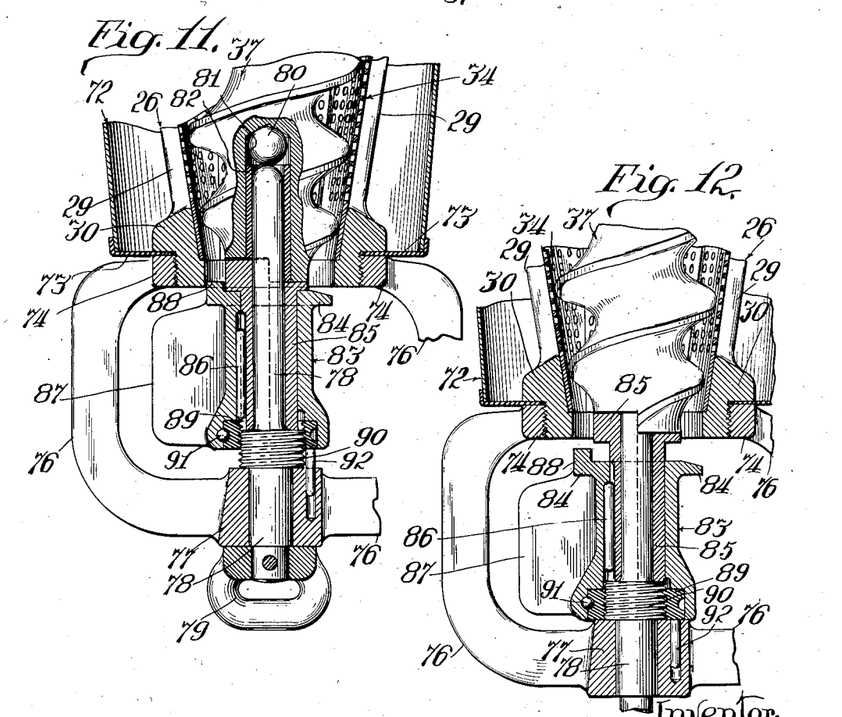
Fig. 11 is a central vertical section through the adjustable parts at the lower end of the feed screw, the screw and the parts rotating therewith being shown in changed position with respect to the showing of Fig. 10, being rotated a quarter of a revolution with respect thereto.
Fig. 12 is a view similar to Fig. 11 but showing a changed position of certain of the parts.

Within the screen 34 and supported in operative position with respect to the screen as hereinafter described, I have provided a tapered screw 37 which extends at its lower end through the open lower end of the screen 34, as is best shown in Figs. 11 and 12. At its upper end, the screw 37 is connected with a ring 38 which is preferably formed integrally with the screw, being connected therewith at one side of the screw, and being reinforced with respect to the ring by means of a web 38a extending partially about the ring 38. The diameter of the opening through the ring 38 is such and the connections between the transversely disposed ring 38 and the upper end of the screw are such that the entire upper end of the screw and its cooperating parts are open so as to permit the passage of the grapes or other material directly into the space between the convolutions of the screw by a movement lengthwise of the screw.

In the construction shown, the ring 38 has secured to it by means of screws 39, a ring 40 which rises in the form of an upwardly extending flange above the ring 38 and which is provided upon its outer edge in position opposite the ring 38 with a worm gear 41, as is best shown in Fig. 3.

Above the frame plate 20 of the machine, I have removably mounted in position a heavy frame member 42 in the form of a ring, such ring 42 being held in position by means of eye bolts 43 at opposite sides of the machine provided with wing nuts 44 thereon which are adapted to engage the upper face of the ring 42 at opposite sides of slots 45, as is best indicated in Fig. 3. The ring 42 serves as the support for a hopper 46 which in the construction shown is in the form of a bowl having its lower end portion fitting snugly within the ring 42 and being secured in position therein by means of rivets 47, the lower end of the bowl being adapted to fit loosely within the upwardly extending flange of the ring 40.

By reason of the tapered form of the screw 37 and the screen 34, the screw is subjected to a heavy end thrust upwardly during operation. For taking care of this end thrust of the screw 37, I have provided an anti-friction bearing device comprising rings 48 and 49 with a series of balls 50 interposed therebetween, such anti-friction device being arranged to bear upon the ring 40 and the ring 42. The anti-friction device as a unit is held in position within the ring 42 by means of a plate 51 held in position by means of rivets 52, as shown in Fig. 3.

For further strengthening the construction and holding the parts in their operative position I have provided pins 53 at opposite sides of the machine for assisting in holding the frame ring 42 from rotation with respect to the frame plate 20.

Figure 2:
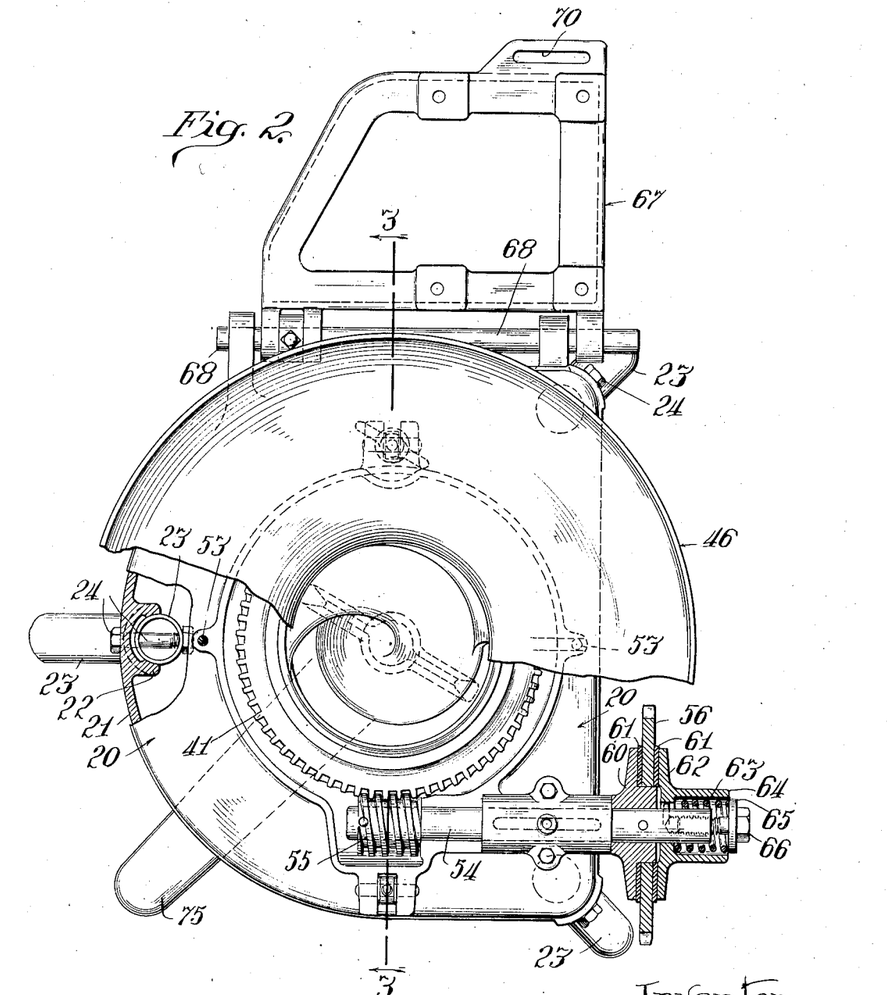
Fig. 2 is a top plan view of the machine shown in Fig. 1, certain parts being broken away for better showing the construction, and the adjustable motor plate being turned into horizontal position for better showing its construction.

The means for rotating the screw 37 comprises a shaft 54 revolubly mounted in a bearing provided by the frame-work, as is best shown in Fig. 2, such shaft being provided with a worm 55 meshing with the worm gear 41 which is connected with the screw as above described. Upon its outer end portion, the shaft 54 is provided with a sprocket gear 56 for rotating it, such gear 56 being connected by means of a chain 57 with the driving pinion 58 of a motor 59 which is mounted in position as hereinafter described. The sprocket gear 56 is connected with the shaft 54 by friction driving means comprising a hub 60 fixed upon the shaft, friction rings 61 on opposite side faces of the gear, and a plate 62 which bears against the outermost friction ring 61, being pressed by a spring 63 into contact with the friction ring. The spring 63 bears at its inner end directly against the plate 62 within a housing 64, and bears at its outer end against a washer 65 held in position upon the shaft 54 by means of a machine screw 66.

Figure 1:
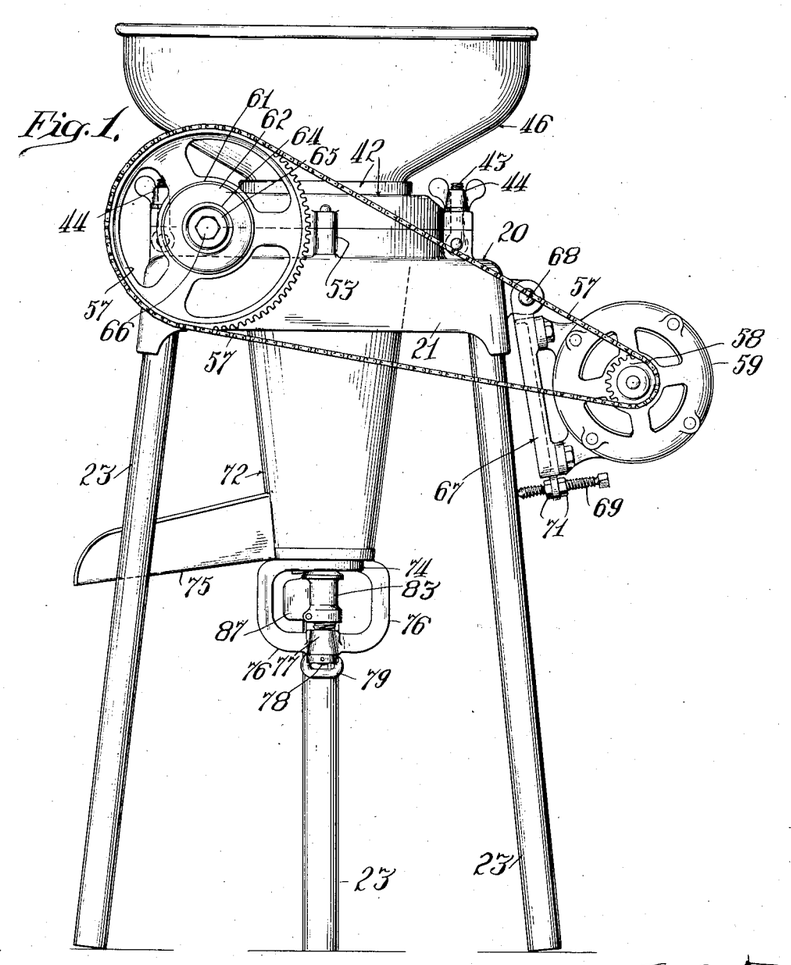
Fig. 1 is a side view of the preferred form of my improved machine.

The motor 59 is mounted upon the frame by means of a plate 67 in the form of a casting which is pivotally mounted upon the frame by means of a horizontally extending pin 68. With the motor 59 secured in position upon the plate 67, the tension of the sprocket chain 57 is regulated by means of a set screw 69 held adjustably in position in a slot 70 in the plate 67 by means of nuts 71 (see Fig. 1). By adjusting the screw 69 longitudinally through the use of the nuts 71 the tension of the chain can be regulated as desired, the bolt 69 being adjusted along the slot 70 as may be necessary for providing the desired contact of the inner end of the bolt with the adjacent leg 23 of the machine.

With the grille 26 in position supported by the flange 28 from the ring 25 of the frame plate 20, the screen 34 is inserted into position. The screw 37 with its attached gear 41 is then dropped into position in the screen, the worm gear 41 being adapted readily to move into mesh with the worm 55. The ring 42 with the anti-friction device and the bowl 46 carried thereby is then placed in position and secured by the wing nuts 44, whereupon the machine is ready for operation. For dismantling the machine, the operation is, of course, reversed, being very readily accomplished whenever desired for the purpose of cleaning the machine.

With the grille 26 in position, a housing 72 preferably formed of sheet metal is slipped into position from below, such housing being held in position at its upper end by contact with the ring or flange 25. At its lower end, the housing comprises a flanged plate 73 which engages a shoulder formed in the ring 30 of the grille 26, being held removably in position by means of a nut 74, as is clearly shown in Figs. 11 and 12. At one side, the housing 72 is provided with a spout 75 which leads preferably to some little distance from the lower end of the housing.

Depending from the nut 74, there are two arms 76 which are connected together at their lower ends by means of a ring 77. Extending through the ring 77, there is a pin 78 which is revolubly mounted within the ring, being provided on its lower end with a removable head 79 by which the pin is adapted to be rotated. The pin 78 extends upwardly from the ring 77 into contact with a ball 80 in an opening 81 in the lower end of the feed screw 37, the ball 80 being held in position within the opening by means of a sleeve 82 through which the pin 78 is adapted to pass. The pin 78 is of such length as to hold the ball 80 in working engagement with the upper end of the opening 81 so as to provide for easy rotation of the screw 37 in centered position in the screen 34 under low load conditions.

Figure 10:
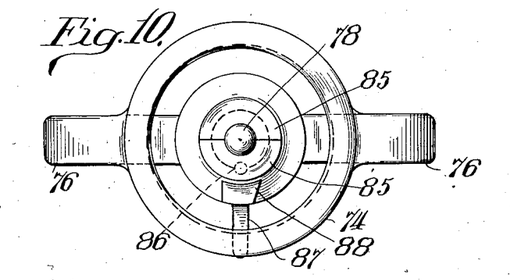
Fig. 10 is a top view of certain of the parts at the lower end of the feed screw.

Upon the pin 78 below the feed screw 37, I have mounted a sleeve 83 adjustable in position with respect to the lower end of the ring 30. The sleeve 83 is provided at its upper end with an outwardly extending flange 84 which extends into close proximity to the inner edge of the ring 30, as is shown in Fig. 11, or which may be adjusted downwardly with respect to the ring into the position as shown in Fig. 12. This sleeve 83 is caused to rotate with the feed screw 37 by the provision of a two-part sleeve 85 between the sleeve 83 and the pin 78, the upper end portion of the sleeve 85 having a notched engagement with the lower end of the feed screw 37 for causing them to rotate together. A pin or key 86 interposed between the sleeves 83 and 85 causes the sleeve 83 in turn to rotate with the sleeve 85. At one side, the sleeve 83 is provided with a radially disposed wing or plate 87 which in its rotation with the feed screw keeps the space between the arms 76 and the sleeve 83 comparatively clear. The flange 84 at one side thereof is also provided on its top face with an upwardly projecting lug 88 which serves to clear from the opening between the flange 84 and the ring 30 any stems or other long particles which might otherwise clog the opening at this point, the lug being of such a size and so positioned preferably as to be able to extend into the space between the ring 30 and the upper end of the sleeve 85. The leading edge of the lug 88 is preferably arranged diagonally as shown in Fig. 10, so as to serve to force the stems outwardly against the ring 30.

The means for adjusting the screw 83 vertically with respect to the ring 30 comprises a nut 89 revolubly mounted in the lower end of the sleeve 83 in engagement with an enlarged threaded portion 90 of the pin 78. A key 91 holds the nut 89 from movement longitudinally with respect to the sleeve 83, and a key or pin 92 holds the nut 89 from rotary movement with the sleeve 83. As will be readily understood, when the pin 78 is rotated through the medium of the head 79 the nut 89 is drawn downwardly, bringing with it the sleeve 83 which has free downward movement along the key 86 with respect to the two-part sleeve 85. The adjustment of the sleeve 83 and the flange 84 as above described with respect to the ring 30 can be accomplished to advantage when the machine is operating so as to obtain the proper adjustment of the size of the opening for the escape of the material at the lower end of the screen.

Figures 4, 5, 6, 7, 8, 9:
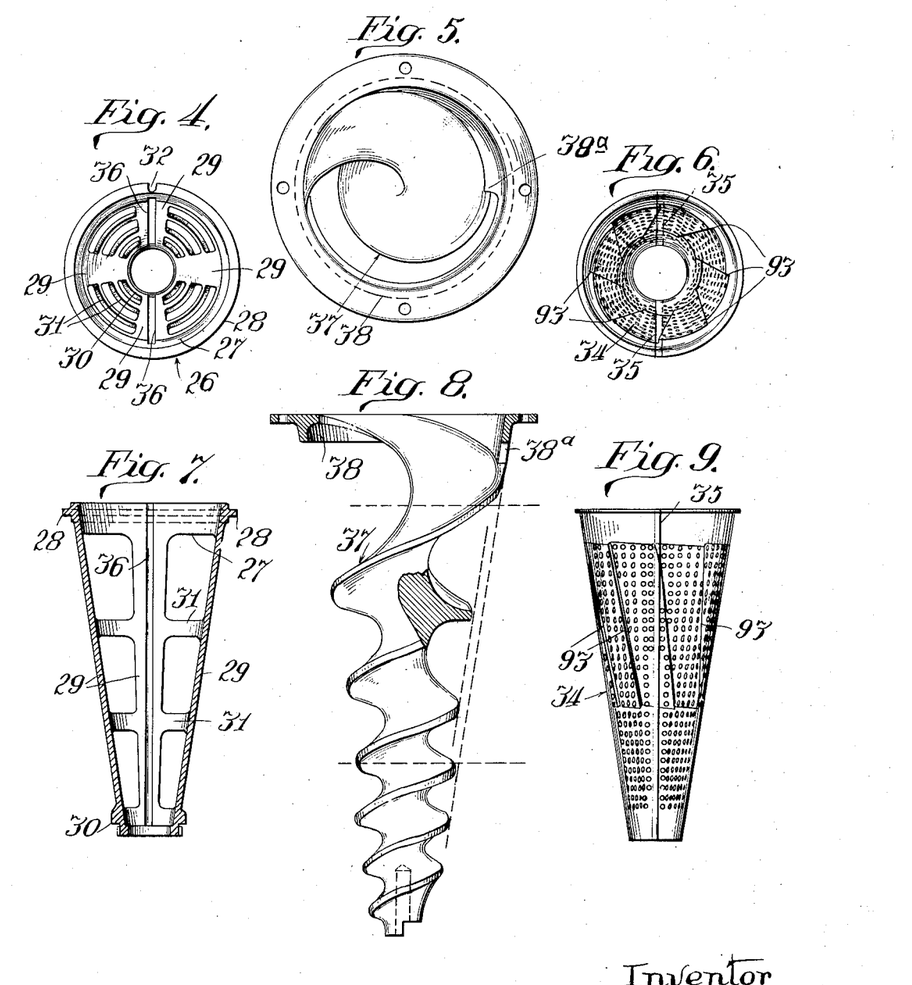
Fig. 4 is a top view of the grille which forms the removable support for the screen.
Fig. 5 is a top view of the screw member.
Fig. 6 is a top view of the screen.
Fig. 7 is a central vertical section through the grille shown in Fig. 4.
Fig. 8 is a side view, partly in section, of the feed screw shown in Fig. 5.
Fig. 9 is a side view of the screen shown in Fig. 6.
Figure 5:
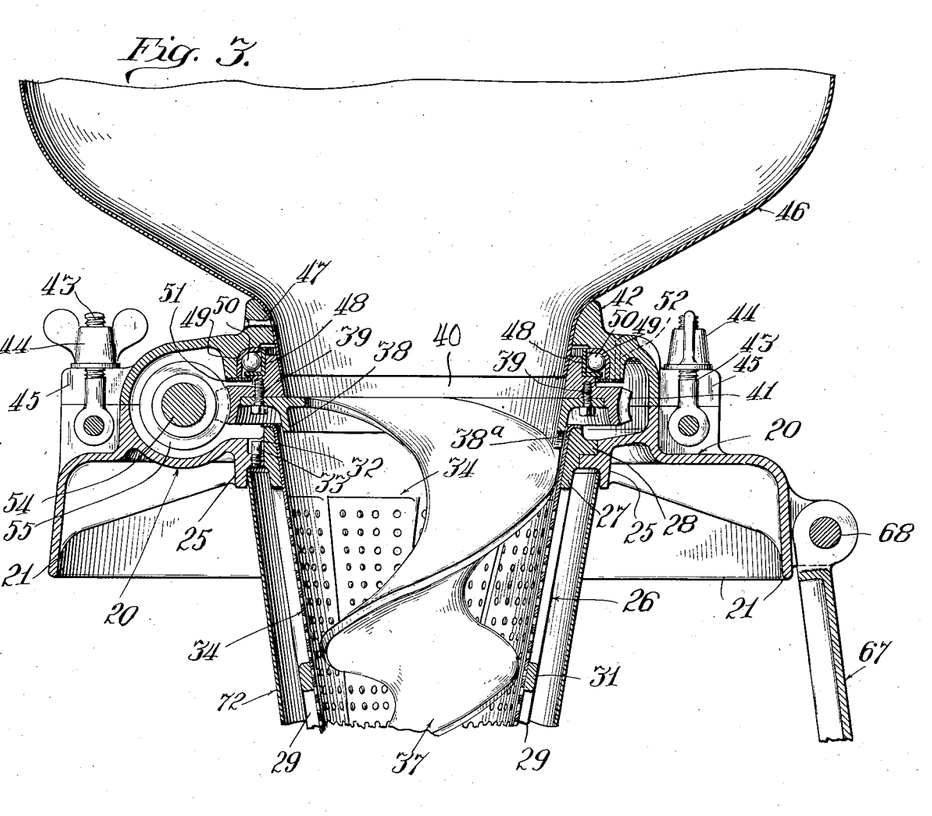

In operation, a supply of grapes or other materials to be operated upon is placed in the hopper 46 and the screw 37 is rotated in counter-clockwise direction in Figs. 2 and 5 by power from the motor 59. By reason of the fact that the upper end of the screw 37 and the adjacent parts are entirely open longitudinally of the screw, the grapes are adapted to pass freely into the compression chamber provided by the screen 34 about the convolutions of the screw 37. For preventing the mass of materials from rotating with the screw within the screen 34, I have provided the screen with a plurality of shoulders 93 pressed therein in diagonal position longitudinally of the screen, such shoulders being in the form of inwardly pressed grooves which are open outwardly. The shoulders 93 are preferably arranged so as to extend at substantially right angles with respect to the adjacent portions of the thread of the screw 37. As is indicated by the dotted lines in Fig. 8, the middle portion of the screw 37 is of diminished size to provide the proper clearance between the edges of the rib of the screw and the shoulders 93. The shoulders 93 do not extend throughout the full length of the screen. On the contrary, a substantial portion of the upper end of the screen and a portion of still greater length at the lower end of the screen are free of the shoulders or grooves. I have found in practice that the grooves or shoulders are not necessary at the upper end of the screen and that it is much easier to prevent clogging of the opening at the lower end of the screen if the shoulders are omitted to that point.

By adjustment of the sleeve 83 with respect to the ring 30, I am enabled to control the condition of the mass of pulp discharged at the lower end of the screen. When grapes are being operated upon, I have found that the sleeve when adjusted to within about one-sixteenth of an inch from the ring 30 causes the pulp to pass in substantially dry condition through such opening. By an adjustment of the sleeve to a distance of three or four sixteenths of an inch from the ring 30, the pulp is permitted to escape while still fairly moist.

I have found in practice that by the use of the projecting lug 88 the stems of the grapes are kept cleared away from between the sleeve 83 and the ring 30, and by the use of the rotating wing or plate 87 the stems and other parts of the pulp are cleared away advantageously from the space between the arms 76 and the sleeve 83.

By reason of the formation of the screw with the bottom face of the rib or convolution substantially horizontal radially, as indicated by the part in section in Fig. 8 of the drawing, the screw is caused to force the material downwardly with a comparatively slight tendency to force the material outwardly. By providing access to the compression chamber at the end of the screw so that the grapes or other material can be fed to the screw in a directly longitudinal direction rather than radially as is common practice, I am enabled to feed the material to much greater advantage, inasmuch as there is comparatively little tendency for the grapes or other material to move upwardly out of the compression chamber after they have been brought into the influence of the screw.

While I prefer to employ a construction as shown in the drawings and as above described, it is to be understood that I do not wish to limit my invention to the form of construction as shown except so far as certain of the claims are specifically so limited, it being understood that changes may well be made in the form and arrangement without departing from the spirit of my invention.

I claim:—

1. A machine of the type described, comprising in combination a frame, a feed screw revolubly mounted in vertical position thereon and having convolutions extending inwardly substantially to the axis of the screw, housing means surrounding the screw providing a compression chamber between the convolutions of the screw substantially from end to end thereof, and means arranged about the periphery of the screw above said housing and rigidly connected with the upper end portion of the screw for driving the screw and having a feed opening therethrough extending substantially from the axis of the screw to the outer edge of the convolution through which opening unrestricted access is provided at all times to the upper end portion of the compression chamber as said screw is rotated.

2. A machine of the type described, comprising in combination a frame, a feed screw revolubly mounted in vertical position thereon and having convolutions extending inwardly substantially to the axis of the screw, housing means surrounding the screw providing a compression chamber between the convolutions of the screw substantially from end to end thereof, and means arranged about the periphery of the screw above said housing and rigidly connected with the upper end portion of the screw for driving the screw and having an unrestricted opening therethrough opposite the end of the screw and corresponding in size and shape thereto for providing free access at all times to the upper end portion of the compression chamber as said screw is rotated.

3. A machine of the type described, comprising in combination a frame, a feed screw revolubly mounted in vertical position thereon and having convolutions extending inwardly substantially to the axis of the screw, housing means surrounding the screw providing a compression chamber between the convolutions of the screw substantially from end to end thereof, a ring formed integrally with the upper end portion of the screw in transverse position thereon above said housing through the opening in which material may be fed lengthwise of the screw into the compression chamber, and means carried by said ring for rotating the ring and screw.

4. A machine of the type described, comprising in combination a frame, a feed screw revolubly mounted in vertical position thereon and having convolutions extending inwardly substantially to the axis of the screw, housing means surrounding the screw providing a compression chamber between the convolutions of the screw substantially from end to end thereof, and a ring in transverse position on the screw at its upper end portion above said housing for driving the screw, said ring being secured to the convolution of the screw at one side only and being in spaced relation with respect to the convolution at the opposite side so as to permit the material to pass freely into the compression chamber into contact with its wall for assuring the forwarding action of the screw.

5. A machine of the type described comprising in combination a frame, a feed screw revolubly mounted on said frame, means surrounding the screw providing a compression chamber between the convolutions of the screw and open at the feed end of the screw for access to said chamber, a ring arranged transversely of the screw and secured thereto at one side for rotating the screw with the opening through the ring opposite said first named opening for permitting material to be fed longitudinally of the screw through said openings into the space between the convolutions, and a web extending partially about the screw between the ring and the outer edge of the adjacent convolution for bracing the ring with respect to the screw.

6. A machine of the type described, comprising in combination a frame, means providing a compression chamber nonrotatably mounted on said frame and held rigidly against downward movement with respect thereto, a feed screw in said compression chamber adapted upon rotation to feed material to be pressed downwardly through said chamber, a ring extending transversely of the feed screw at its upper end and connected at one side with said screw, an anti-friction bearing device on said ring, means connected with the ring between the compression chamber and the anti-friction bearing device for driving the ring and screw, and a heavy thrust ring removably secured on said frame above said anti-friction bearing device serving to hold said screw against upward movement out of position in said compression chamber, said compression chamber and said feed screw being arranged to be lifted out of position on the frame upon removal of the thrust ring therefrom.

7. A machine of the type described, comprising in combination a frame, means providing a compression chamber nonrotatably mounted on said frame and held rigidly against downward movement with respect thereto, a feed screw in said compression chamber adapted upon rotation to feed material to be pressed downwardly through said chamber, a ring extending transversely of the feed screw at its upper end and connected at one side with said screw, an anti-friction bearing device on said ring, means connected with the ring between the compression chamber and the anti-friction bearing device for driving the ring and screw, a heavy thrust ring removably secured on said frame above said anti-friction bearing device serving to hold said screw against upward movement out of position in said compression chamber, and a hopper carried by said thrust ring and extending downwardly inside of the anti-friction bearing and said first named ring for feeding material to be pressed directly into the end of the compression chamber longitudinally of the screw, said compression chamber and said screw being arranged to be lifted out of position on the frame upon removal of the thrust ring and hopper therefrom.

8. A machine of the type described, comprising in combination a frame plate, a frame member in the form of a ring removably mounted on said frame plate, a ring rotatably mounted on said frame beneath said removable frame member, an anti-friction bearing device carried by said removable frame member in position to engage said rotatable ring, a feed screw connected with said rotatable ring at one side thereof, means surrounding the screw providing a compression chamber between the convolutions of the screw to which material may be fed through the opening in the ring, and means connected with the ring between the compression chamber and the anti-friction bearing device for driving the ring and the screw, said ring and screw being arranged to be lifted out of position with respect to the compression chamber upon the removal of the anti-friction bearing device and its connected frame member from the frame plate.

9. A machine of the type described, comprising in combination a vertically arranged compression chamber, a ring revolubly mounted at the upper end of said compression chamber, a hopper above said ring opening downwardly into said compression chamber, a feed screw revolubly mounted in said compression chamber and connected at one side with said ring, the convolutions of said screw being of such depth and being so arranged that the upper end portion of the screw transversely across the entire bottom opening of the hopper is shaped to receive material downwardly from the hopper directly into the compression chamber, and means for rotating said ring for driving the screw.

10. A machine of the type described, comprising in combination a frame, a compression chamber having its wall in the form of a screen, a feed screw revolubly mounted in said compression chamber for feeding material through the chamber for discharge at its lower end, means for rotating the screw, a lug extending into the annular opening between the lower end of the screw member and the lower end of the compression chamber, and means for carrying said lug about with the screw, said lug having a diagonally disposed leading face whereby the lug by its rotation is adapted to assist in breaking up the mass of material for ejection from the chamber.

11. A machine of the type described, comprising in combination a frame, a compression chamber mounted on said frame, a feed screw revolubly mounted in said compression chamber and adapted to feed material through the chamber, a ring transversely disposed with respect to the screw and connected with the screw at its upper end, said ring extending downwardly into the upper end of the compression chamber, a hopper mounted on said frame above said ring and extending downwardly into the ring so as to open into the compression chamber through the ring, and means at one side of the ring for driving it for rotating the screw with respect to the hopper and the compression chamber, said hopper and ring being arranged to be lifted freely out of position with respect to said compression chamber and said driving means for removing the screw from the compression chamber.

12. A machine of the type described, comprising in combination a frame, a tapered skeleton reinforcing member secured rigidly in position on said frame, a tapered screen within said tapered member and supported thereby, said screen being provided with a longitudinally extending rib at one side thereof adapted by engagement with a groove in the inner face of the reinforcing member to hold the screen from rotating with respect thereto, a screw revolubly mounted in said screen, and means for rotating said screw.

13. A machine of the type described, comprising in combination a frame, a tapered skeleton reinforcing member secured in position on said frame, a tapered screen within said tapered member and supported thereby, a tapered screw revolubly mounted in said screen, means for rotating said screw, an upwardly extending pin carried by the reinforcing member for centering the lower end of the screw in the screen, a sleeve carried around by the screw at its lower end in position to enter the discharge opening between the screen and the screw structure, a lug on the top face of said sleeve, a blade projecting outwardly from one side of said sleeve, and means actuated by the rotation of the pin for adjusting said sleeve longitudinally of the screw for controlling the effective size of the discharge opening from the screen.

14. A machine of the type described comprising in combination a frame having an opening therethrough, a screen extending through said opening and removably supported by said frame, a screw removably mounted within said screen, a second frame member removably secured on said first named frame member, means carried by said second frame member for holding the screw down in operative position in said screen, a shaft journaled in said first named frame, and gearing connecting said shaft and said screw for driving the screw.

15. A machine of the type described, comprising in combination a frame having an opening therethrough, a tapered skeleton reinforcing member extending through said opening and removably supported by said frame, a screen in said reinforcing member and removably supported thereby, a tapered screw in said screen and revolubly and removably supported in operative position with respect thereto, a ring secured to said screw transversely thereof at the periphery only of the screw so as to provide access through the ring to the space between the convolutions, a second frame member removably secured on said first named frame member, means carried by said second frame member adapted by engagement with said ring to hold the screw down in operative position in said screen, a shaft journaled in said first named frame, a worm gear connected with said ring, and a worm carried by said shaft meshing with said worm gear for driving the screw and adapted to permit removal of the gear from its position on the frame.

16. In a machine of the type described, a frame, a screen carried thereby and having a vertical axis, a tapered feed-screw rotatable therein, a housing surrounding said screw and spaced therefrom, a ring member secured to the upper end of the feed-screw, said ring member being journalled in the frame, means for rotating said ring member, and means for feeding material to be pressed to said feed-screw through said ring.

17. In a machine of the type described, a frame, a screen carried thereby and having a vertical axis, a tapered feed-screw rotatable therein, a housing surrounding said screw and spaced therefrom, a ring member secured to the upper end of the feed-screw, said ring member being journalled in the frame, means for rotating said ring member, and a hopper carried by the frame for feeding material to be pressed to said feed-screw through said ring.

18. In a machine of the type described, a frame, a screen carried thereby and having a vertical axis, a tapered feed-screw rotatable therein, a housing surrounding said screw and spaced therefrom, a ring member secured to the upper end of the feed-screw, said ring member being journalled in the frame, means for rotating said ring member, and a hopper carried by the frame for feeding material to be pressed to said feed-screw through said ring, the upper portion of the frame being made up of two sections removably secured together, the upper section carrying the hopper and the journal for said ring.

ALEXANDER F. KAPTULLER.